United States Patent Office 3,419,778
Patented Dec. 31, 1968

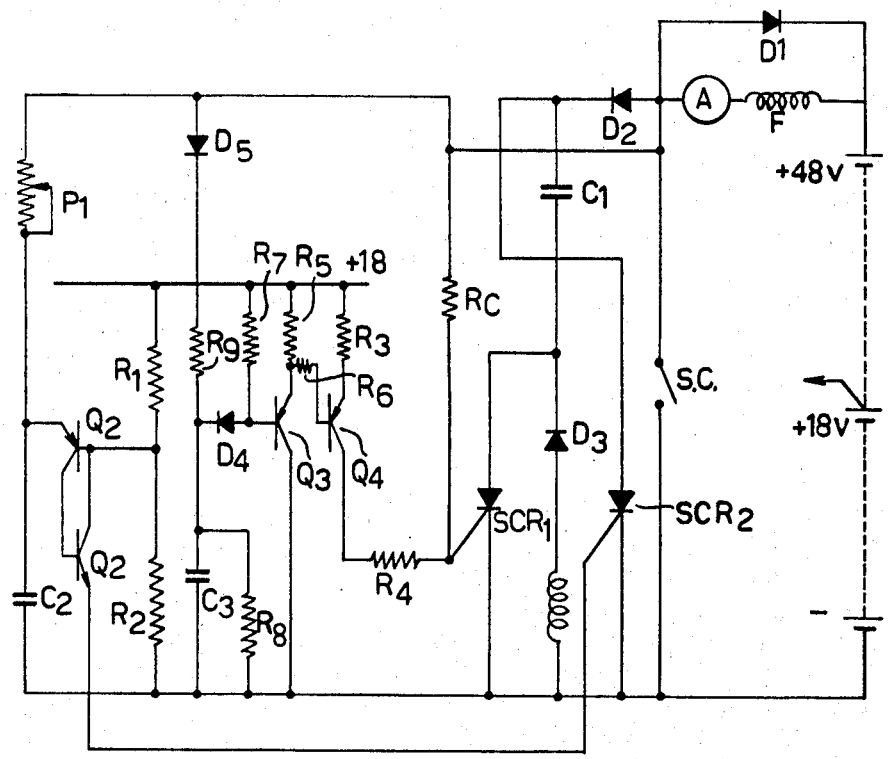

3,419,778
PULSE CONTROLLED CIRCUIT FOR A
BATTERY LOAD
Isaac David Gurwicz, Gateshead, England, assignor to
Sevcon Engineering Limited, Gateshead, England
Filed Oct. 19, 1964, Ser. No. 404,864
Claims priority, application Great Britain, Oct. 23, 1963,
41,732/63
3 Claims. (Cl. 318—341)

ABSTRACT OF THE DISCLOSURE

A pulse generator circuit is inserted between the supply and the load. This allows the trigger of an "off" controlled rectifier to be connected to a source of triggering potential to fire the rectifier whenever a main "on" controlled rectifier is in the non-coducting position. Hence, the capacitor in the circuit is brought to full supply potential independently of any interruption of the charging current. This allows the circuit to regain control after shorting out the pulse circuit and provide smoothness of operation when control is regained.

---

This invention is for improvements in or relating to control means for electrical apparatus.

The invention is concerned with a control system for electrical apparatus comprising a pulse generator circuit adapted to be inserted between the supply and the apparatus to be controlled and means for adjusting or modulating the mark space ratio of the pulses and thereby the mean power applied to the motor. For instance, said means may be designed to adjust or modulate the pulse frequency or the pulse width.

In apparatus of the character with which the present invention is concerned it is convenient to provide, in some cases, means whereby the pulse control system can be rendered inoperative and control of the apparatus (e.g. a motor or motors) switched, for example, to a control arrangement comprising normal resistance switching and/or contactor control gear. For example, it may be desirable when a motor under the control of the pulse control system has been brought to full speed or load to switch out or short circuit the pulse control system and connect the motor directly to the supply through a contactor.

One object of the present invention is to provide an arrangement whereby this switching from pulse control to another form of control and back from said other form of control to pulse control can be effected satisfactorily.

It has been found, with systems of the character above set forth, that when the pulse control system is short circuited, it is impossible to regain control, through the pulse control system, if the regulating potentiometer or other speed adjusting means of the system is set to anything but a low pulse rate.

With a view to overcoming this difficulty a "slugged" relay has been included in the system to open the circuit of the main silicon controlled rectifier trigger for a short time after the short circuiting contactor has opened. This arrangement, whilst satisfactory from the point of view of regaining control through the pulse control system, causes a vehicle, driven by a motor under the control of the system, to hesitate and then move forward with a jerk when the relay re-makes the circuit. Thus, the arrangement is not entirely satisfactory.

A further proposed solution is the connection of a fairly small resistor across the "off" silicon controlled rectifier (SCR2) of the pulse control system. Whilst this enables the pulse control system to operate after opening of the shorting contractor, a short time lapse is required before remaking the circuit to the main silicon controlled rectifier trigger. Here again, therefore, the arrangement does not constitute an entire solution of the problem.

A further object of the present invention is, therefore, to solve the problem of reversion to pulse control in such a way that a motor or other electrical apparatus is brought back immediately under the control of the pulse control system when the shorting contactor is opened.

According to the present invention there is provided a system of the character above set forth wherein the trigger of the "off" controlled rectifier is connected to a source of triggering potential to fire it whenever the main "on" controlled rectifier is in the non-conducting condition. Thus, the capacitor (hereinafter referred to as C1) in the circuit must always charge to full battery or supply potential independently of any interruption of the charging current due to arcing at the shorting contactor or transients. Conveniently this source of triggering potential is the battery or supply, which may be connected to the rectifier trigger through the motor and a resistor or other current limiting means.

One particular system embodying the improvements according to the present invention will now be described by way of example with reference to the accompanying diagram.

For the purpose of the present invention a resistor $R_c$ is included in the circuit as shown.

In the diagram S.C. indicates the shorting contactor by which the pulse control circuit can be rendered inoperative to control the motor A.F. which in this particular instance is a batery operated motor which it may be assumed drives a vehicle. The pulse frequency and therefore the speed of the vehicle is controlled by means of the potentiometer P1.

The resistor $R_c$ is necessary to refire the silicon controlled rectifier SCR1 to ensure that the capacitor C1 is fully charged.

The following will illustrate further the necessity for the resistor $R_c$ and what happens if this resistor is omitted.

Assuming the resistor $R_c$ is omitted and the shorting contactor S.C. is closed and then reopened, if the voltage across the capacitor C1 is measured this may be found to be insufficient for commutation (i.e. there is an insufficient stored charge in the capacitor). The reason for this is that when the shorting contactor S.C. opens, no voltage appears across it since the silicon controlled rectifier SCR1 is in the conducting mode, due to trigger current via the transistor Q4, and capacitor C1 is discharged. As the capacitor C1 charge rises, an arc strikes across the shorting contactor tips, the tips having barely separated. Current ceases to flow through the silicon controlled rectifier SCR1 which turns off. Due to the normal action of the firing circuit C3, R8, the silicon controlled rectifier SCR1 is not refired by transistor Q4. The contactor arc then extinguishes, the tips having moved further apart, leaving capacitor C1 charged only to an extent insufficient for commutation.

To ensure that capacitor C1 is fully charged, it is necessary to refire silicon controlled rectifier SCR1. The inclusion of the resistor $R_c$ ensures this.

The inclusion in the system of the resistor $R_c$ makes it unnecessary to connect a capacitor across D2 as was previously done in the systems described in the specifications listed above. The value of $R_c$ should of course be high enough so that current through it does not interfere with the normal pulsing action of the circuit.

I claim:
1. In a circuit for a series type electric motor comprising essentially a source of direct current, said series motor and a first silicon controlled rectifier in a series circuit; a control system including a short-circuiting contactor connected across the anode and cathode of said rectifier; a commutating capacitor and a second silicon controlled rectifier connected in parallel with said first rectifier; a variable oscillator having its output connected to the firing electrode of said second rectifier; and a connection from the firing electrode of said second silicon controlled rectifier to a source of firing potential which is activated whenever said first silicon controlled rectifier is non-conducting.

2. A control system as recited in claim 1 wherein said connection to said firing electrode of said second rectifier includes a resistor of a value much greater than the output resistance of said oscillator.

3. A control system as recited in claim 1, including a first diode connected across said series motor and a second diode connected between said motor and said commutating capacitor.

References Cited

UNITED STATES PATENTS

| 3,222,583 | 12/1965 | Gutzwiller | 318—345 X |
| 2,911,579 | 11/1959 | Mueller | 318—416 X |
| 3,092,766 | 6/1963 | Hansen | 318—341 |

BENJAMIN DOBECK, *Primary Examiner.*

K. L. CROSSON, *Assistant Examiner.*

U.S. Cl. X.R.

318—345